US012735084B2

(12) United States Patent
Zhang

(10) Patent No.: US 12,735,084 B2
(45) Date of Patent: Sep. 15, 2026

(54) FOLDING CART

(71) Applicant: Jinhua Mutao Leisure Products Co., Ltd., Jinhua (CN)

(72) Inventor: Xiangshan Zhang, Suzhou (CN)

(73) Assignee: Jinhua Mutao Leisure Products Co., Ltd., Jinhua (CN)

( * ) Notice: Subject to any disclaimer, the term of this patent is extended or adjusted under 35 U.S.C. 154(b) by 333 days.

(21) Appl. No.: 18/433,348

(22) Filed: Feb. 5, 2024

(65) Prior Publication Data

US 2025/0196902 A1 Jun. 19, 2025

(30) Foreign Application Priority Data

Dec. 14, 2023 (CN) ........................ 202323413737.X

(51) Int. Cl.
*B62B 3/02* (2006.01)
*B62B 5/06* (2006.01)

(52) U.S. Cl.
CPC ................ *B62B 3/02* (2013.01); *B62B 5/067* (2013.01); *B62B 2205/06* (2013.01); *B62B 2301/254* (2013.01)

(58) Field of Classification Search
CPC ....... B62B 3/02; B62B 5/067; B62B 2205/06; B62B 2301/254
See application file for complete search history.

(56) References Cited

U.S. PATENT DOCUMENTS

| | | | | |
|---|---|---|---|---|
| 10,435,055 | B1 * | 10/2019 | Zhu | B62B 3/007 |
| 2023/0049293 | A1 * | 2/2023 | Wu | B62B 3/007 |
| 2023/0406384 | A1 * | 12/2023 | Sun | B62B 3/02 |
| 2025/0249945 | A1 * | 8/2025 | Luo | B62B 3/106 |
| 2025/0333089 | A1 * | 10/2025 | Lin | B62B 3/02 |

FOREIGN PATENT DOCUMENTS

CN 215883720 U * 2/2022

* cited by examiner

*Primary Examiner* — James A Shriver, II
*Assistant Examiner* — Nicholas R. Kandas
(74) *Attorney, Agent, or Firm* — Bayramoglu Law Offices LLC

(57) ABSTRACT

A folding cart includes a front frame mechanism, a rear frame mechanism, a bottom frame mechanism, a first folding mechanism, and a second folding mechanism. The front frame mechanism and the rear frame mechanism are vertically and oppositely arranged, a first horizontal tube and a second horizontal tube are respectively hinged to two ends of the first folding mechanism, the first horizontal tube is hinged to a first side of the front frame mechanism, and the second horizontal tube is hinged to a first side of the rear frame mechanism; a third horizontal tube and a fourth horizontal tube are respectively hinged to two ends of the second folding mechanism, the third horizontal tube is hinged to a second side of the front frame mechanism, and the fourth horizontal tube is hinged to a second side of the rear frame mechanism.

9 Claims, 8 Drawing Sheets

FOLDING CART

CROSS-REFERENCE TO THE RELATED APPLICATIONS

This application is based upon and claims priority to Chinese Patent Application No. 202323413737.X, filed on Dec. 14, 2023, the entire contents of which are incorporated herein by reference.

TECHNICAL FIELD

The present disclosure relates to the technical field of folding carts, and in particular, to a folding cart.

BACKGROUND

In daily life and production, it is often necessary to carry luggage or articles, and carts are often used in this process. Carts are widely used because they can be pushed easily and save time and effort. Many carts now use a flat plate, with wheels mounted under the flat plate for carrying. This kind of cart cannot be folded, and thus takes up a lot of space when it is not in use, and is not convenient to carry.

At present, there are some foldable carts. However, these foldable carts have limited volume after being unfolded and are still too large when folded.

SUMMARY

(I) Technical Problem to be Solved

In view of the above defects and shortcomings of the prior art, the present disclosure provides a folding cart, which solves the technical problems that the existing foldable carts have a limited volume after being unfolded and are still too large after being folded.

(II) Technical Solution

To achieve the above objective, the folding cart of the present disclosure includes a front frame mechanism, a rear frame mechanism, a bottom frame mechanism, a first folding mechanism, and a second folding mechanism, where the front frame mechanism and the rear frame mechanism are vertically and oppositely arranged, a first horizontal tube and a second horizontal tube are respectively hinged to two ends of the first folding mechanism, the first horizontal tube is hinged to a first side of the front frame mechanism, and the second horizontal tube is hinged to a first side of the rear frame mechanism; a third horizontal tube and a fourth horizontal tube are respectively hinged to two ends of the second folding mechanism, the third horizontal tube is hinged to a second side of the front frame mechanism, and the fourth horizontal tube is hinged to a second side of the rear frame mechanism; and the bottom frame mechanism includes a first bottom frame assembly and a second bottom frame assembly hinged to each other, the first bottom frame assembly is hinged to the front frame mechanism, and the second bottom frame assembly is hinged to the rear frame mechanism.

Optionally, the front frame mechanism and the rear frame mechanism each include a portal frame and a first connecting horizontal tube, and the first connecting horizontal tube is connected to a lower end of the portal frame.

Optionally, the portal frame includes a second connecting horizontal tube, and a first vertical tube and a second vertical tube parallel to each other;

a lower end of the first vertical tube and a lower end of the second vertical tube are both connected to the first connecting horizontal tube, and an upper end of the first vertical tube and an upper end of the second vertical tube are both connected to the second connecting horizontal tube through bent tubes;

a first horizontal tube is hinged to the first vertical tube of the front frame mechanism, a second horizontal tube is hinged to the first vertical tube of the rear frame mechanism, a third horizontal tube is hinged to the second vertical tube of the front frame mechanism, and a fourth horizontal tube is hinged to the second vertical tube of the rear frame mechanism; and the first vertical tube and the second vertical tube of the front frame mechanism are both hinged to the first bottom frame assembly, and the first vertical tube and the second vertical tube of the rear frame mechanism are both hinged to the second bottom frame assembly.

Optionally, the first folding mechanism and the second folding mechanism each include a first fork lever assembly, a second fork lever assembly, and a third fork lever assembly hinged in sequence.

Optionally, the first fork lever assembly includes a first crossover tube and a second crossover tube hinged to each other, the second fork lever assembly includes a third crossover tube and a fourth crossover tube hinged to each other, and the third fork lever assembly includes a fifth crossover tube and a sixth crossover tube hinged to each other;

the first crossover tube, the fourth crossover tube, and the fifth crossover tube are hinged in sequence, and the second crossover tube, the third crossover tube, and the sixth crossover tube are hinged in sequence;

the first crossover tube and the sixth crossover tube of the first folding mechanism are respectively hinged to the first horizontal tube and the second horizontal tube in one-to-one correspondence, and the first crossover tube and the sixth crossover tube of the second folding mechanism are respectively hinged to the third horizontal tube and the fourth horizontal tube in one-to-one correspondence; and the second crossover tube and the fifth crossover tube of the first folding mechanism are respectively hinged to the first side of the front frame mechanism and the first side of the rear frame mechanism in one-to-one correspondence, and the second crossover tube and the fifth crossover tube of the second folding mechanism are respectively hinged to the second side of the front frame mechanism and the second side of the rear frame mechanism in one-to-one correspondence.

Optionally, the first bottom frame assembly and the second bottom frame assembly each include a first vertical connection tube, a second vertical connection tube, and a bottom frame;

the bottom frame is connected between the first vertical connection tube and the second vertical connection tube, and the first vertical connection tube is parallel to the second vertical connection tube;

first ends of the first vertical connection tubes of the first bottom frame assembly and the second bottom frame assembly are hinged to each other, and second ends of the first vertical connection tubes of the first bottom frame assembly and the second bottom frame assembly are respectively hinged to the front frame mechanism and the rear frame mechanism in one-to-one correspondence; and first ends of the second vertical connection tubes of the first bottom frame assembly and the second bottom frame assembly are hinged to each other, and second ends of the second vertical connection tubes of the first bottom frame assembly and the second bottom frame assembly are respectively hinged to the front frame mechanism and the rear frame mechanism in one-to-one correspondence.

Optionally, the bottom frame includes a first horizontal connection tube, a second horizontal connection tube, and a plurality of third vertical connection tubes;

a first end of the first horizontal connection tube and a first end of the second horizontal connection tube are both connected to the first vertical connection tube, a second end of the first horizontal connection tube and a second end of the second horizontal connection tube are both connected to the second vertical connection tube, the first horizontal connection tube is parallel to the second horizontal connection tube, and the plurality of third vertical connection tubes are arranged between the first horizontal connection tube and the second horizontal connection tube at intervals.

Optionally, the folding cart further includes a U-shaped boom, where a first end of the U-shaped boom is hinged to the first folding mechanism, a second end of the U-shaped boom is hinged to the second folding mechanism, and the first bottom frame assembly is capable of abutting against the U-shaped boom.

Optionally, the folding cart further includes a handle mechanism, where the handle mechanism includes a telescopic rod and a pull ring, a first end of the telescopic rod is hinged to the front frame mechanism, and a second end of the telescopic rod is connected to the pull ring.

Optionally, a bottom of the front frame mechanism and a bottom of the rear frame mechanism are each provided with a pair of rollers.

(III) Beneficial Effects

The third horizontal tube and the fourth horizontal tube are respectively hinged to the two ends of the second folding mechanism, the third horizontal tube is hinged to the second side of the front frame mechanism, and the fourth horizontal tube is hinged to the second side of the rear frame mechanism. The unfolding length of the folding mechanisms is increased through the connection of the first horizontal tube, the second horizontal tube, the third horizontal tube and the fourth horizontal tube. Moreover, in the folding process of the cart, the horizontal tubes are rotatably folded. After the four horizontal tubes are folded and contracted, the length of the folding mechanisms can be effectively reduced, thereby reducing the folding volume of the cart. The first bottom frame assembly is hinged to the front frame mechanism, and the second bottom frame assembly is hinged to the rear frame mechanism. When the first bottom frame assembly and the second bottom frame assembly are folded, the front frame mechanism and the rear frame mechanism approach each other, thereby reducing the length of the cart, and then reducing the volume of the cart. By setting the lengths of the first bottom frame assembly and the second bottom frame assembly, the folded cart is not higher than the unfolded cart, thereby facilitating the storage by a user. According to the folding cart of the present disclosure, the structure of the cart is optimized through the horizontal tubes and the bottom frame mechanism, such that the height of the cart after being folded is very small, and the capacity of the cart is very large after the cart is open.

REFERENCE NUMERALS

Figure 1:
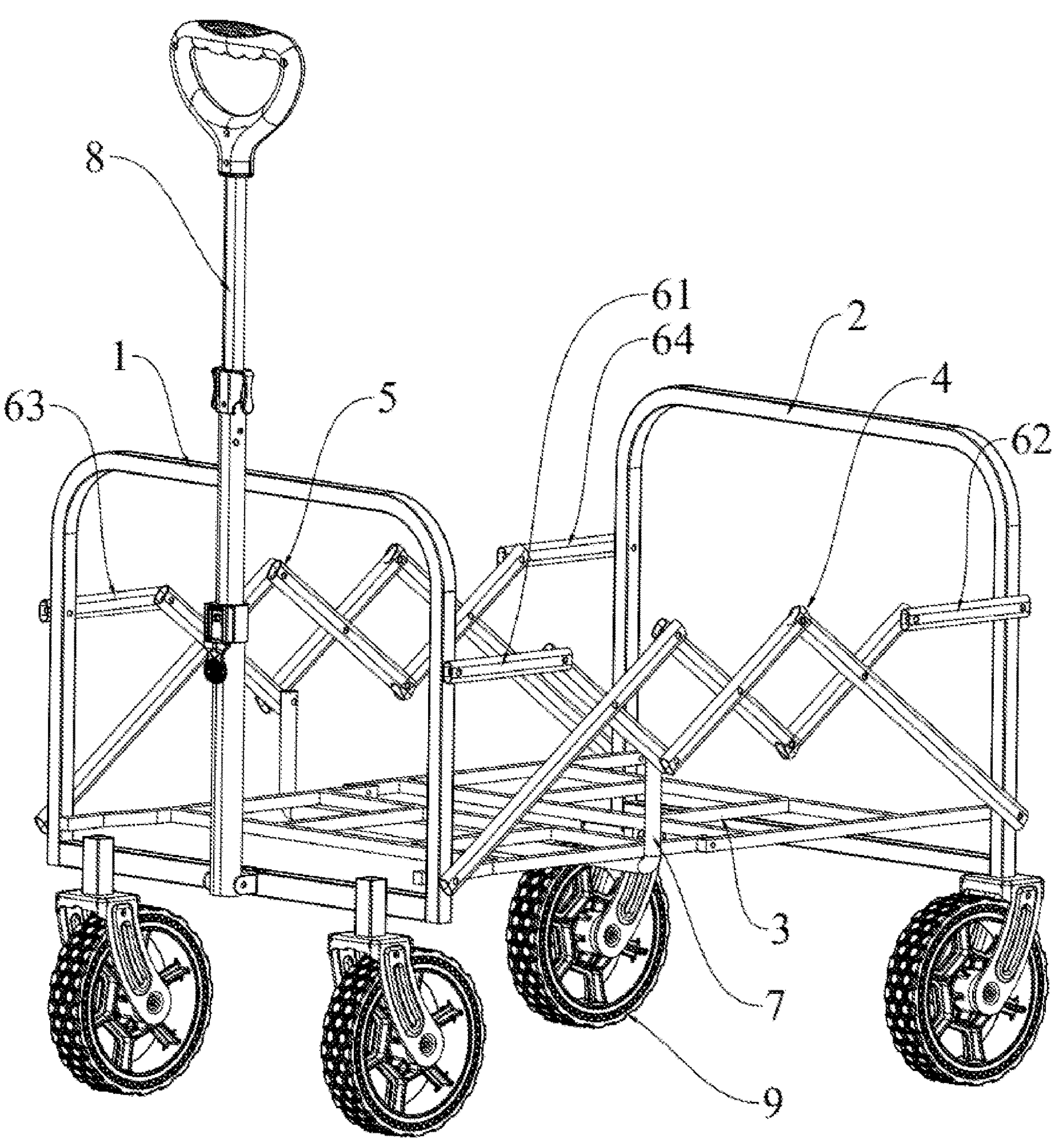
FIG. 1 is a stereogram of a folding cart in an unfolded state according to the present disclosure.

- 1: Front frame mechanism; 11: First connecting horizontal tube; 12: Second connecting horizontal tube; 13: First vertical tube; 14: Second vertical tube;
- 2: Rear frame mechanism;
- 3: Bottom frame mechanism; 31: First bottom frame assembly; 32: Second bottom frame assembly; 311: First vertical connection tube; 312: Second vertical connection tube; 313: First horizontal connection tube; 314: Second horizontal connection tube; 315: Third vertical connection tube;
- 4: First folding mechanism; 41: First crossover tube; 42: Second crossover tube; 43: Third crossover tube; 44: Fourth crossover tube; 45: Fifth crossover tube; 46: Sixth crossover tube;
- 5: Second folding mechanism;
- 61: First horizontal tube; 62: Second horizontal tube; 63: Third horizontal tube; 64: Fourth horizontal tube;
- 7: U-shaped boom;
- 8: Handle mechanism; 81: Telescopic rod; 82: Pull ring;
- 9: Roller.

DETAILED DESCRIPTION OF THE EMBODIMENTS

In order to better explain the present disclosure and facilitate understanding, the present disclosure is described in detail below with reference to the drawings and specific implementations. The terms such as “upper” and “lower” mentioned herein are based on the orientations shown in FIG. 1.

Although the drawings show the exemplary embodiments of the present disclosure, it should be understood that the present disclosure may be implemented in various forms and should not be limited to the embodiments set forth herein. On the contrary, these embodiments are provided such that the present disclosure is more fully understandable, and fully conveys the scope of the present disclosure to those skilled in the art.

As shown in FIG. 1 to FIG. 8, the present disclosure provides a folding cart, including front frame mechanism 1, rear frame mechanism 2, bottom frame mechanism 3, first folding mechanism 4, and second folding mechanism 5. In an unfolded state of the folding cart, the front frame mechanism 1 and the rear frame mechanism 2 are vertically and oppositely arranged. First horizontal tube 61 and second horizontal tube 62 are respectively hinged to two ends of the first folding mechanism 4, the first horizontal tube 61 is hinged to a first side of the front frame mechanism 1, and the second horizontal tube 62 is hinged to a first side of the rear frame mechanism 2. Third horizontal tube 63 and fourth horizontal tube 64 are respectively hinged to two ends of the second folding mechanism 5, the third horizontal tube 63 is hinged to a second side of the front frame mechanism 1, and the fourth horizontal tube 64 is hinged to a second side of the rear frame mechanism 2. The unfolding length of the folding mechanisms is increased through the connection of the first horizontal tube 61, the second horizontal tube 62, the third horizontal tube 63 and the fourth horizontal tube 64. Moreover, in the folding process of the cart, the horizontal tubes are rotatably folded. After the four horizontal tubes are folded and contracted, the length of the folding mechanisms can be effectively reduced, thereby reducing the folding volume of the cart. The bottom frame mechanism 3 includes first bottom frame assembly 31 and second bottom frame assembly 32 hinged to each other, the first bottom frame assembly 31 and the second bottom frame assembly 32 can rotate around hinge points each other to reach a folded state. The first bottom frame assembly 31 is hinged to the front frame mechanism 1, and the second bottom frame assembly 32 is hinged to the rear frame mechanism 2. When the first bottom frame assembly 31 and the second bottom frame assembly 32 are folded, the front frame mechanism 1 and the rear frame mechanism 2 approach each other, thereby reducing the length of the cart, and then reducing the volume of the cart. By setting the lengths of the first bottom frame assembly 31 and the second bottom frame assembly 32, the folded cart is not higher than the unfolded cart, thereby facilitating the storage by a user. According to the folding cart of the present disclosure, the structure of the cart is optimized through the horizontal tubes and the bottom frame mechanism 3, such that the height of the cart after being folded is very small, and the capacity of the cart is very large after the cart is open.

As shown in FIG. 1 to FIG. 8, the front frame mechanism 1 and the rear frame mechanism 2 each include a portal frame and first connecting horizontal tube 11, and the first connecting horizontal tube 11 is connected to a lower end of the portal frame to increase the strength of the portal frame. Furthermore, the portal frame includes second connecting horizontal tube 12, and first vertical tube 13 and second vertical tube 14 parallel to each other; a lower end of the first vertical tube 13 and a lower end of the second vertical tube 14 are both connected to the first connecting horizontal tube 11, and an upper end of the first vertical tube 13 and an upper end of the second vertical tube 14 are both connected to the second connecting horizontal tube 12 through bent tubes, such that the beauty of the portal frame is improved, and sharp corners can also be avoided. First horizontal tube 61 is hinged to the first vertical tube 13 of the front frame mechanism 1, second horizontal tube 62 is hinged to the first vertical tube 13 of the rear frame mechanism 2, third horizontal tube 63 is hinged to the second vertical tube 14 of the front frame mechanism 1, and fourth horizontal tube 64 is hinged to the second vertical tube 14 of the rear frame mechanism 2. The first vertical tube 13 and the second vertical tube 14 of the front frame mechanism 1 are both hinged to the first bottom frame assembly 31, and the first vertical tube 13 and the second vertical tube 14 of the rear frame mechanism 2 are both hinged to the second bottom frame assembly 32.

Figure 2:
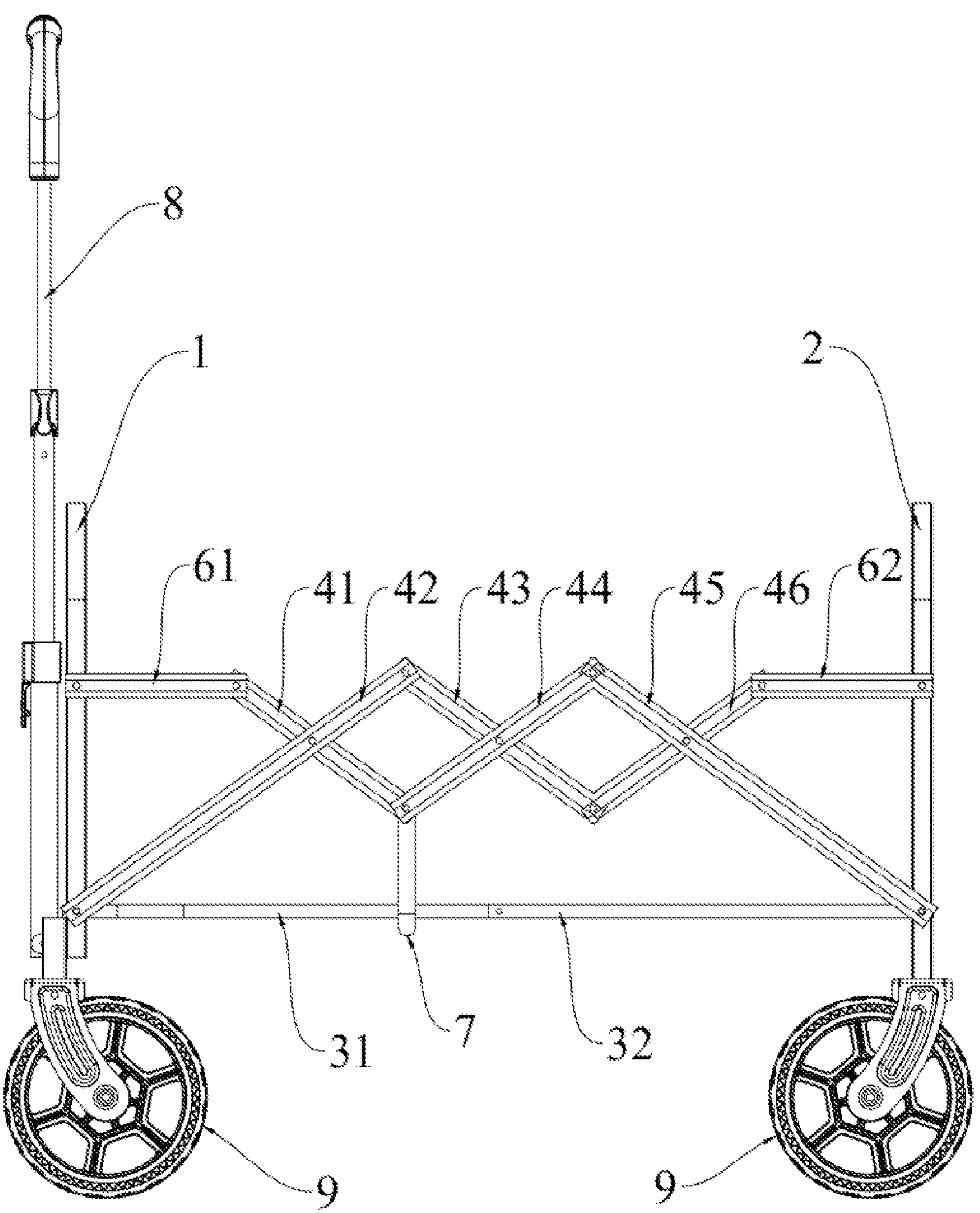
FIG. 2 is a front view of a folding cart in an unfolded state according to the present disclosure.
Figure 3:
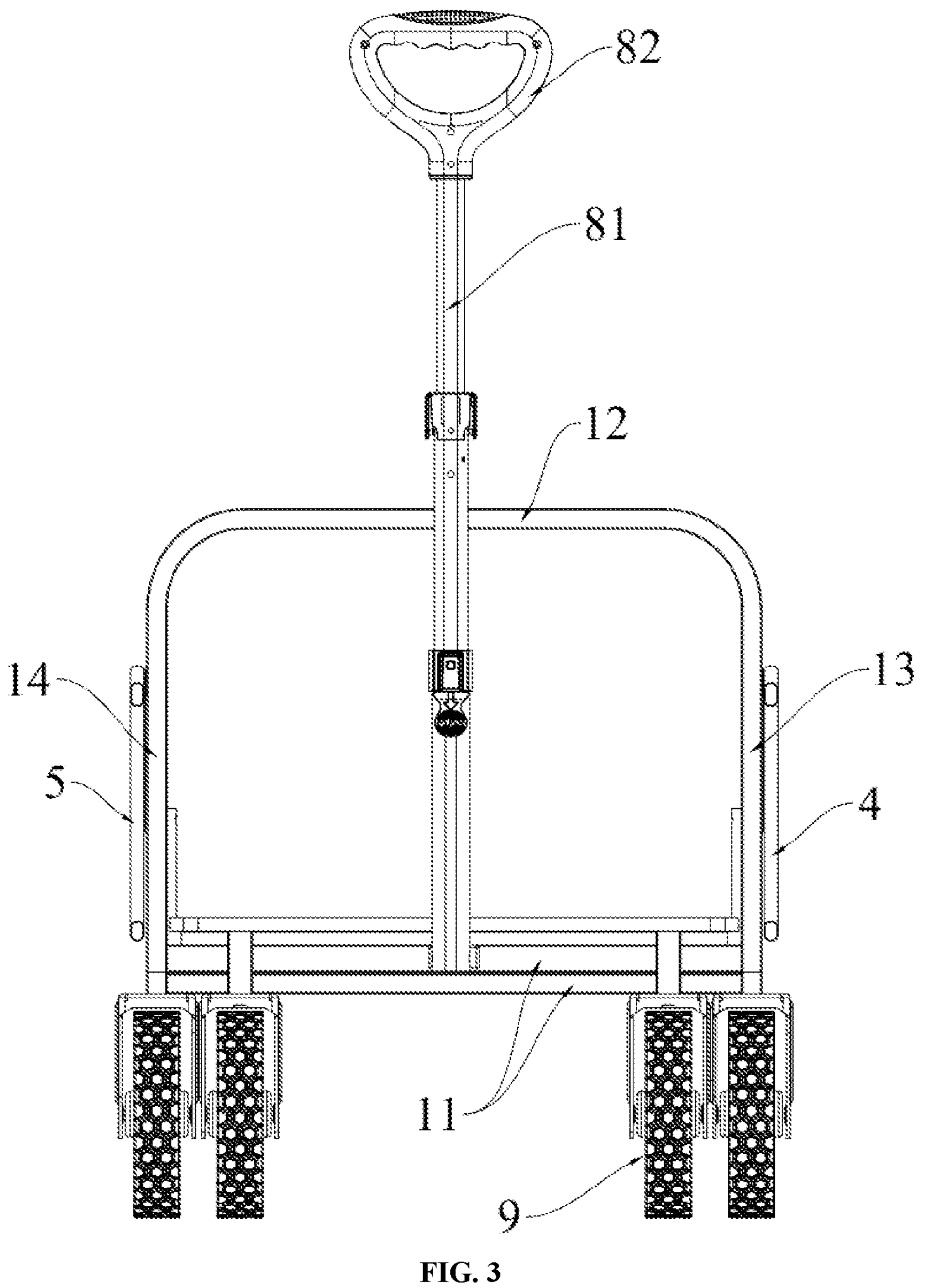
FIG. 3 is a left view of a folding cart in an unfolded state according to the present disclosure.

As shown in FIG. 1 and FIG. 2, the first folding mechanism 4 and the second folding mechanism 5 each include a first fork lever assembly, a second fork lever assembly, and a third fork lever assembly hinged in sequence. The first folding mechanism 4 and the second folding mechanism 5 have the same structure and are symmetrical in mounting positions. The structure and mounting mode of the first folding mechanism 4 in FIG. 2 will be described. The first fork lever assembly includes first crossover tube 41 and second crossover tube 42 hinged to each other, the second fork lever assembly includes third crossover tube 43 and fourth crossover tube 44 hinged to each other, and the third fork lever assembly includes fifth crossover tube 45 and sixth crossover tube 46 hinged to each other. The first crossover tube 41, the fourth crossover tube 44, and the fifth crossover tube 45 are hinged in sequence, and the second crossover tube 42, the third crossover tube 43, and the sixth crossover tube 46 are hinged in sequence. The first crossover tube 41 and the sixth crossover tube 46 of the first folding mechanism 4 are respectively hinged to the first horizontal tube 61 and the second horizontal tube 62 in one-to-one correspondence, and the first crossover tube 41 and the sixth crossover tube 46 of the second folding mechanism 5 are respectively hinged to the third horizontal tube 63 and the fourth horizontal tube 64 in one-to-one correspondence. The second crossover tube 42 and the fifth crossover tube 45 of the first folding mechanism 4 are respectively hinged to the lower ends of the first vertical tubes 13 of the front frame mechanism 1 and the first side of the rear frame mechanism 2 in one-to-one correspondence, and the second crossover tube 42 and the fifth crossover tube 45 of the second folding mechanism 5 are respectively hinged to the lower ends of the second vertical tubes 14 of the front frame mechanism 1 and the second side of the rear frame mechanism 2 in one-to-one correspondence. The first horizontal tube 61 lowers the hinge position of the first crossover tube 41 on the first vertical tubes 13 of the front frame mechanism 1, and the second horizontal tube 62 lowers the hinge position of the sixth crossover tube 46 on the first vertical tubes 13 of the rear frame mechanism 2. In this way, while the distance between the ends of the first crossover tube 41 and the second crossover tube 42 and the corresponding vertical tubes is increased, the use of the first vertical tube 13 having a larger height caused by excessive lengths of the first crossover tube 41 and the second crossover tube 42 is avoided. Therefore, when the unfolding length of the first folding mechanism 4 is increased, the front frame mechanism 1 and the rear frame mechanism 2 having a larger height are not needed, thereby reducing the height of the cart in the folded state, and facilitating the storage by the user.

Figure 4:
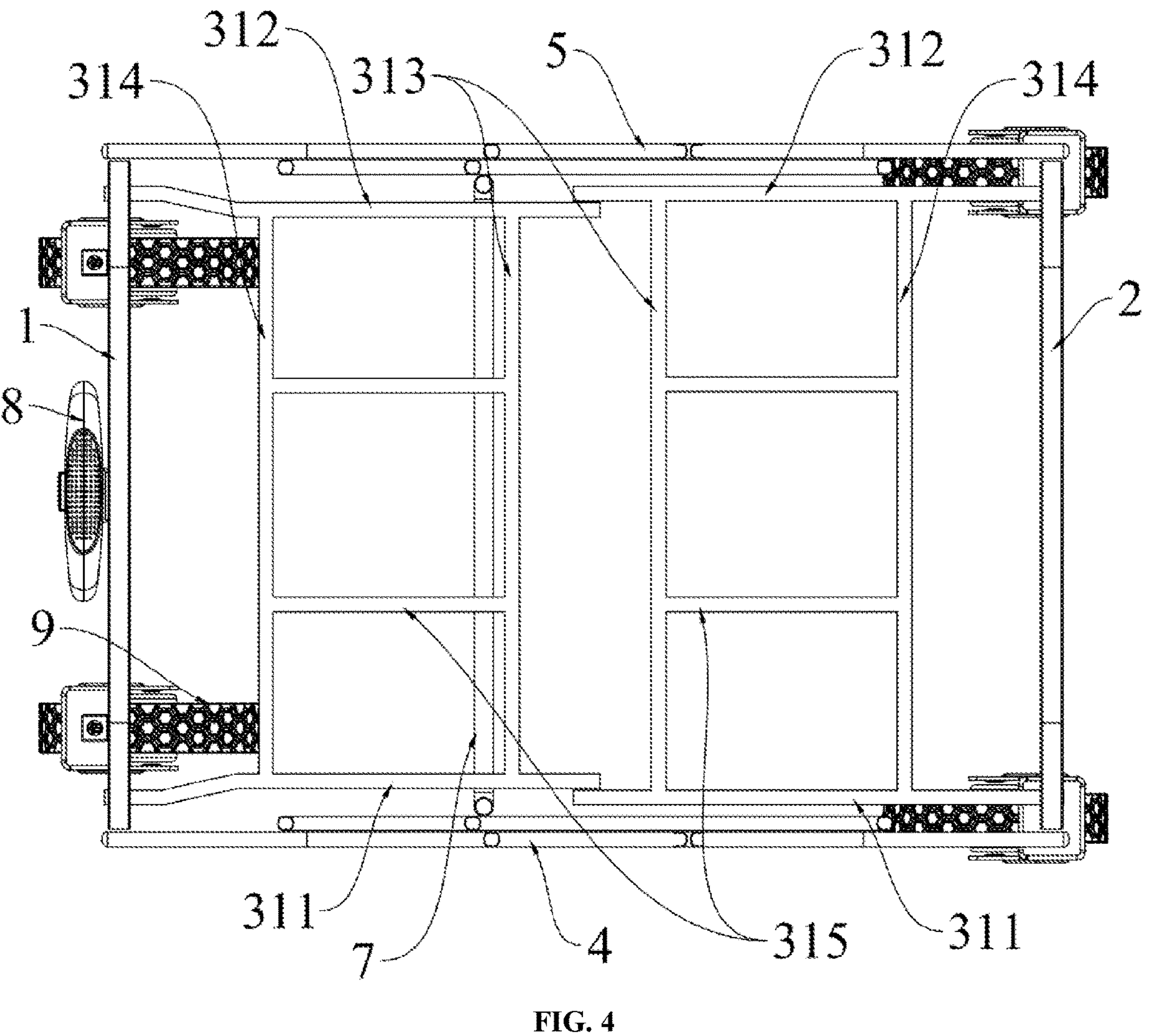
FIG. 4 is a top view of a folding cart in an unfolded state according to the present disclosure.
Figure 5:
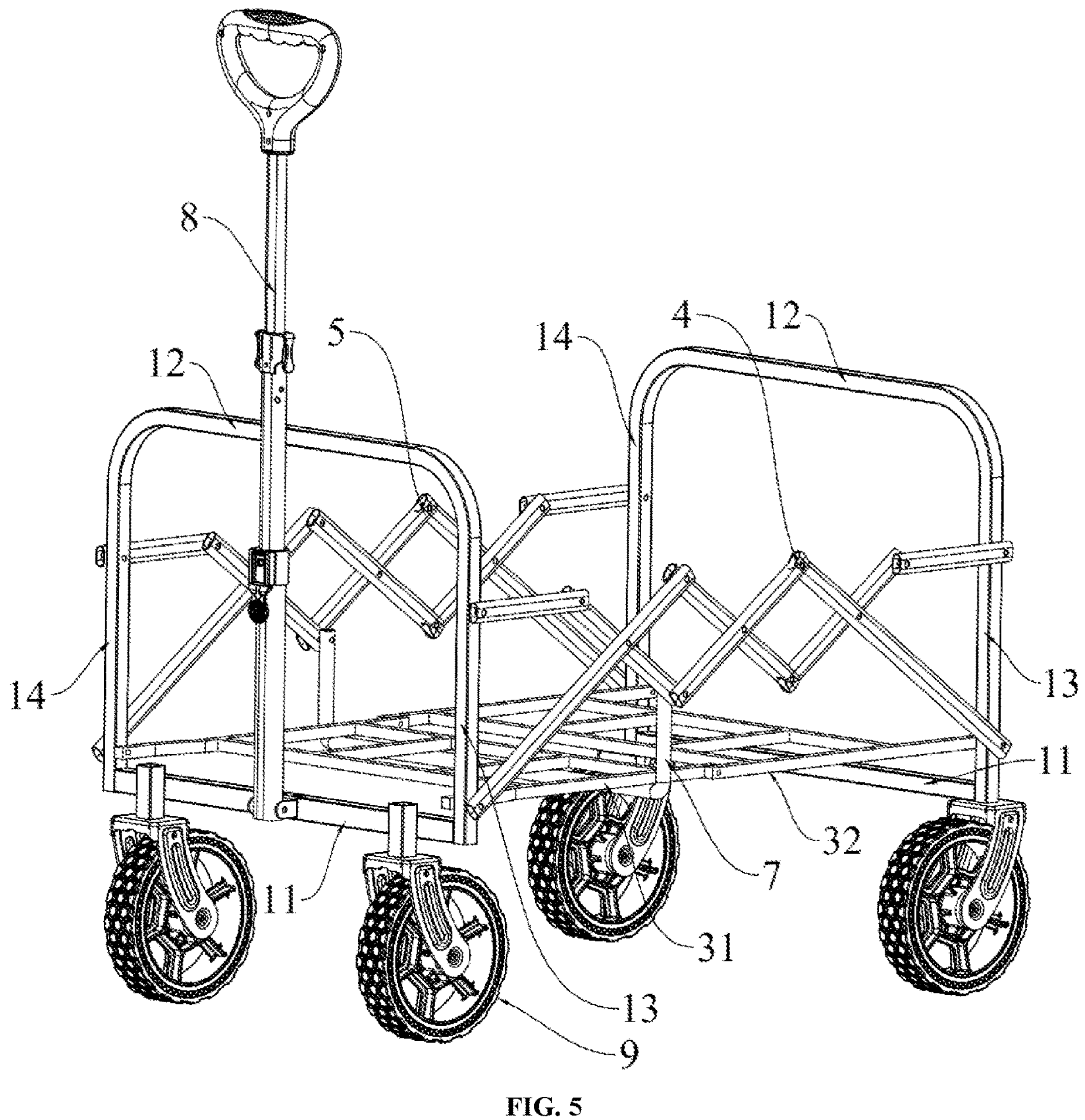
FIG. 5 is a schematic structural diagram of a folding cart according to the present disclosure.
Figure 6:
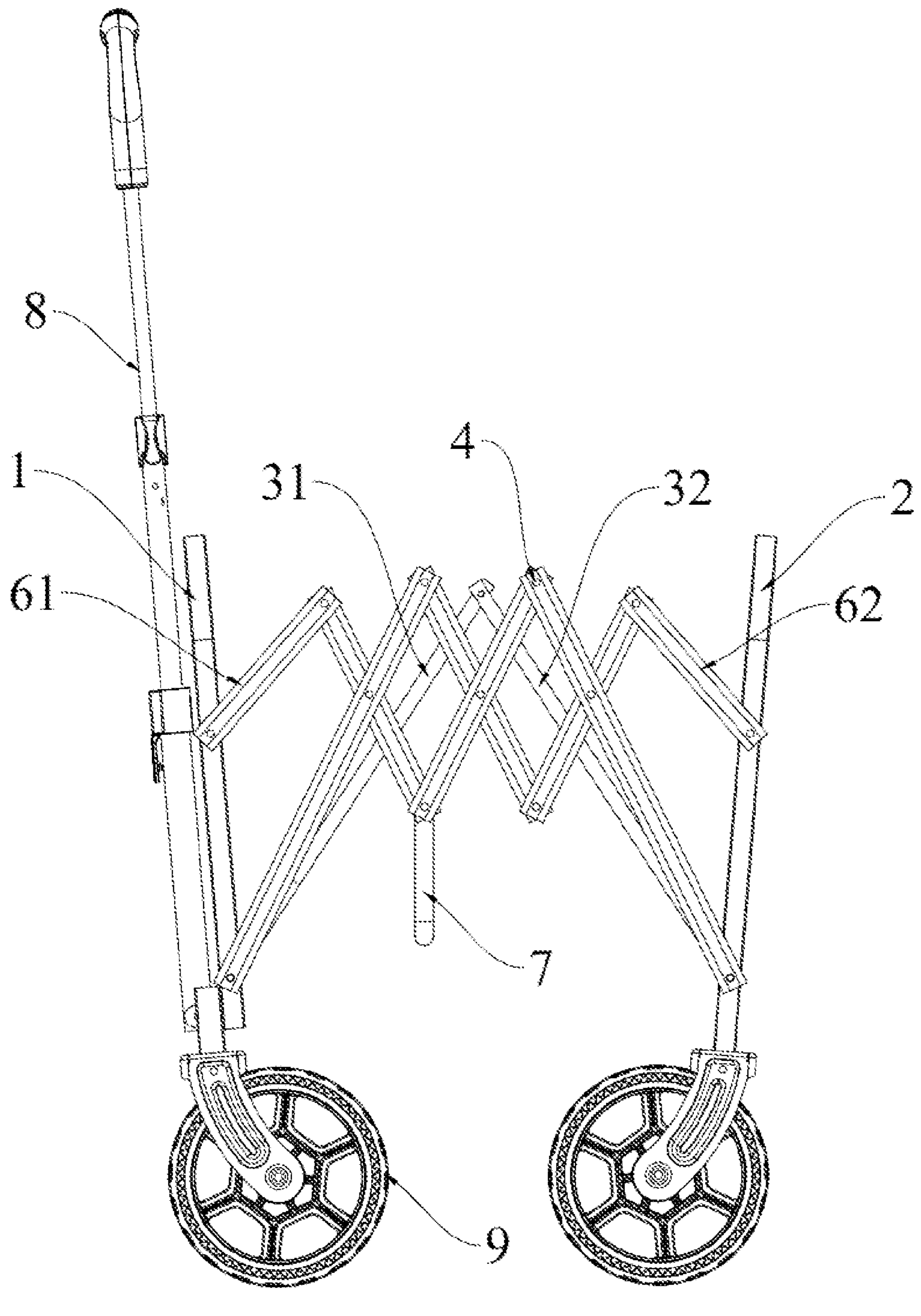
FIG. 6 is a front view of a folding cart in a half-folded state according to the present disclosure.
Figure 7:
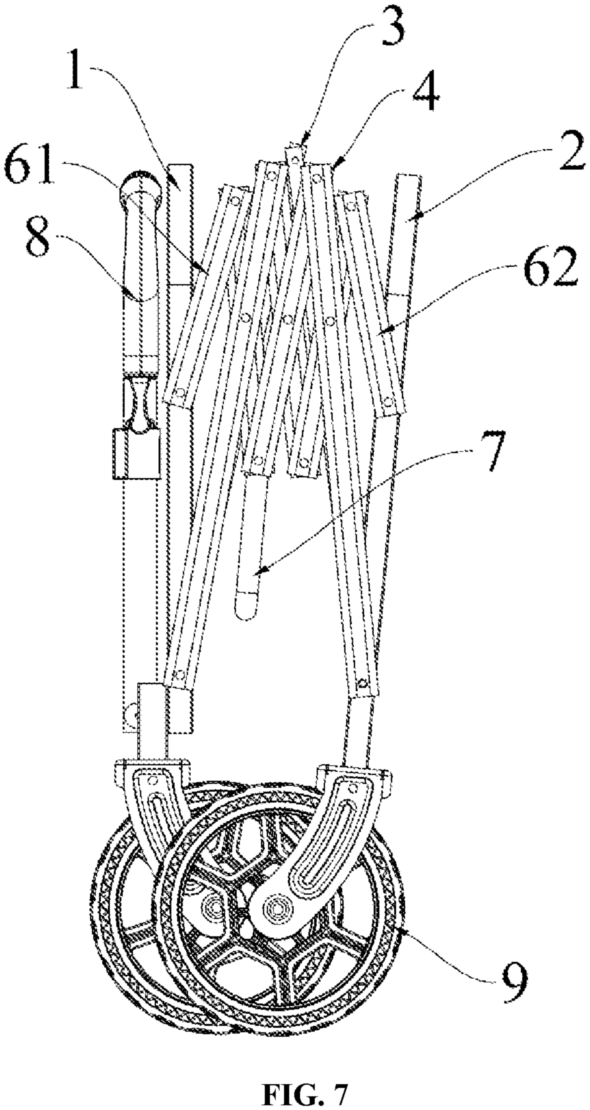
FIG. 7 is a front view of a folding cart in a folded state according to the present disclosure.
Figure 8:
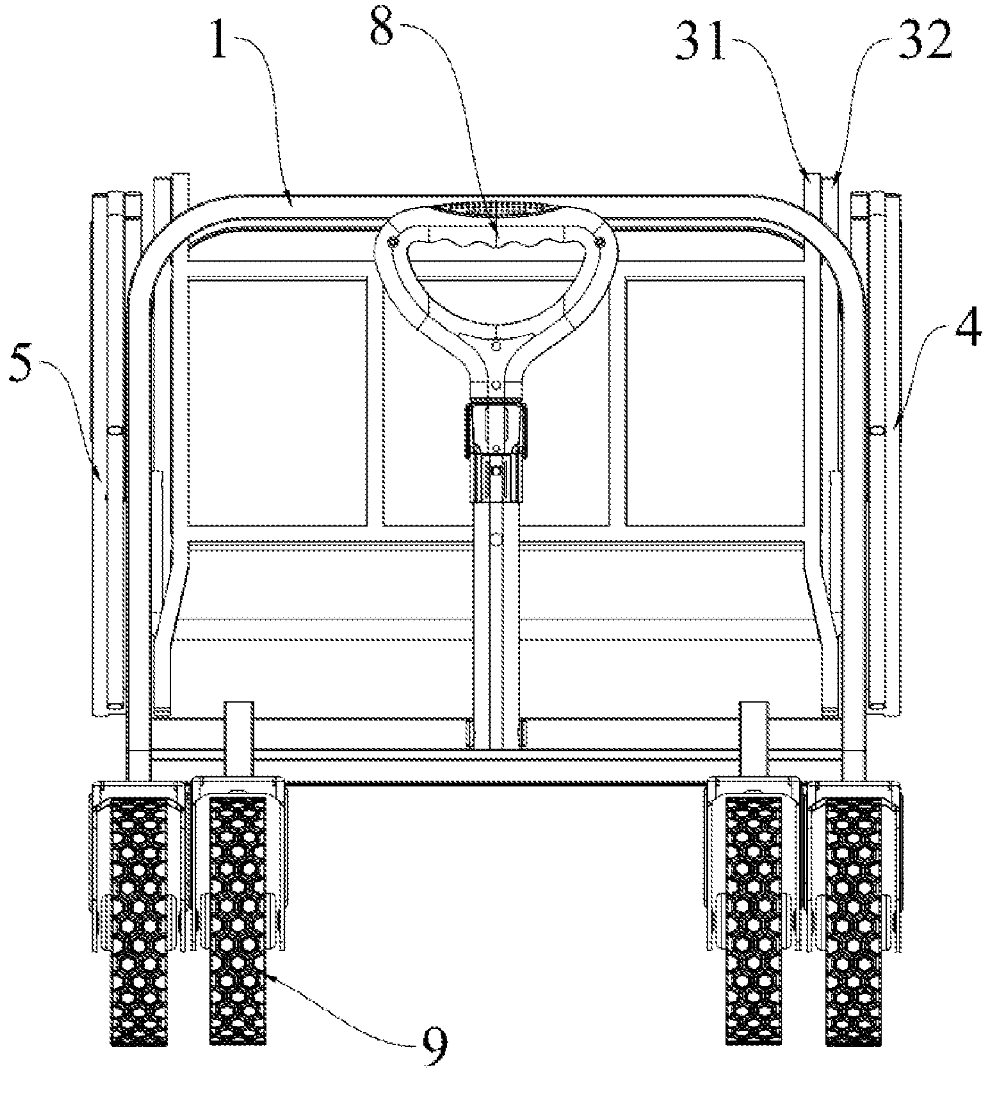
FIG. 8 is a left view of a folding cart in a folded state according to the present disclosure.

As shown in FIG. 1 and FIG. 4, the first bottom frame assembly 31 and the second bottom frame assembly 32 each include first vertical connection tube 311, second vertical connection tube 312, and a bottom frame. The bottom frame is connected between the first vertical connection tube 311 and the second vertical connection tube 312, and the first vertical connection tube 311 is parallel to the second vertical connection tube 312. First ends of the first vertical connection tubes 311 of the first bottom frame assembly 31 and the second bottom frame assembly 32 are hinged to each other, and second ends of the first vertical connection tubes 311 of the first bottom frame assembly 31 and the second bottom frame assembly 32 are respectively hinged to the lower ends of the first vertical tubes 13 of the front frame mechanism 1 and the rear frame mechanism 2 in one-to-one correspondence. First ends of the second vertical connection tubes 312 of the first bottom frame assembly 31 and the second bottom frame assembly 32 are hinged to each other, and second ends of the second vertical connection tubes 312 of the first bottom frame assembly 31 and the second bottom frame assembly 32 are respectively hinged to the lower ends of the second vertical tubes 14 of the front frame mechanism 1 and the rear frame mechanism 2 in one-to-one correspondence. Please referring to FIG. 6 to FIG. 8, when the cart is folded, the second ends of the first vertical connection tube 311 and the second vertical connection tube 312 rotate downwards, the first bottom frame assembly 31 and the second bottom frame assembly 32 are folded mutually, and the middle of the bottom frame mechanism 3 rises up to finally form the folded state.

Furthermore, please referring to FIG. 4, the bottom frame includes first horizontal connection tube 313, second horizontal connection tube 314, and a plurality of third vertical connection tubes 315. A first end of the first horizontal connection tube 313 and a first end of the second horizontal connection tube 314 are both connected to the first vertical connection tube 311, a second end of the first horizontal connection tube 313 and a second end of the second horizontal connection tube 314 are both connected to the second vertical connection tube 312, the first horizontal connection tube 313 is parallel to the second horizontal connection tube 314, two ends of each third vertical connection tube 315 are respectively connected to the first horizontal connection tube 313 and the second horizontal connection tube 314 in one-to-one correspondence, and the plurality of third vertical connection tubes 315 are arranged at intervals along length directions of the first horizontal connection tube 313 and the second horizontal connection tube 314 to increase the support strength of the bottom frame.

As shown in FIG. 1 to FIG. 8, the folding cart further includes U-shaped boom 7. A first end of the U-shaped boom 7 is hinged to the first folding mechanism 4, the first end is located on an inner side of the first folding mechanism 4, and a hinge point is located at a hinge place between the first crossover tube 41 and the fourth crossover tube 44 of the first folding mechanism 4. A second end of the U-shaped boom 7 is hinged to the second folding mechanism 5, the second end is located on an inner side of the second folding mechanism 5, and a hinge point is located at a hinge place between the first crossover tube 41 and the fourth crossover tube 44 of the second folding mechanism 5. When the first folding mechanism 4 and the second folding mechanism 5 are folded, the U-shaped boom 7 moves up together with the folding mechanisms. In the unfolded state, the first bottom frame assembly 31 abuts against the bottom of the U-shaped boom 7, thereby further increasing the support strength of the bottom frame mechanism 3, and improving the bearing capability of the cart.

As shown in FIG. 1 to FIG. 8, the folding cart further includes handle mechanism 8. The handle mechanism 8 includes telescopic rod 81 and pull ring 82, a first end of the telescopic rod 81 is hinged to the front frame mechanism 1, and a second end of the telescopic rod 81 is connected to the pull ring 82. When the cart is dragged, an included angle between the telescopic rod 81 and the front frame mechanism 1 and the length of the telescopic rod 81 can be freely changed, thereby improving user experience. The pull ring 82 facilitates the gripping by the user. After the cart is folded, the telescopic rod 81 is contracted to the shortest length, and the telescopic rod 81 abuts against the front frame mechanism 1 to reduce the folding volume of the cart.

A bottom of the front frame mechanism 1 and a bottom of the rear frame mechanism 2 are each provided with a pair of rollers 9. Preferably, universal wheels are provided at the bottom of the front frame mechanism 1. The folding cart further includes a cloth container. The cloth container is sleeved in an area defined by the front frame mechanism 1, the rear frame mechanism 2, the bottom frame mechanism 3, the first folding mechanism 4 and the second folding mechanism 5, and the front frame mechanism 1 and the rear frame mechanism 2 are both detachably connected to the cloth container.

It should be understood that in the description of the present disclosure, terms such as “first” and “second” are used merely for a descriptive purpose, and should not be construed as indicating or implying relative importance, or implicitly indicating the number of indicated technical features. Thus, features defined with “first” and “second” may explicitly or implicitly include one or more of the features. In the description of the present disclosure, “a plurality of” means two or more, unless otherwise specifically defined.

In the present disclosure, unless otherwise clearly specified, the terms such as “mounting”, “interconnection”, “connection” and “fixation” are intended to be understood in a broad sense. For example, the “connection” may be a fixed connection, removable connection or integral connection; may be a mechanical connection or electrical connection; may be a direct connection or indirect connection using a medium; and may be a communication or interaction between two elements. Those of ordinary skill in the art may understand specific meanings of the above terms in the present disclosure based on a specific situation.

In the present disclosure, unless otherwise explicitly specified, when it is described that a first feature is “above” or “below” a second feature, it indicates that the first and second features are in direct contact or the first and second features are in indirect contact through an intermediate feature. In addition, when it is described that the first feature is “over”, “above” and “on” the second feature, it indicates that the first feature is directly or obliquely above the second feature, or simply indicates that an altitude of the first feature is higher than that of the second feature. When it is described that a first feature is “under”, “below” or “beneath” a second feature, it indicates that the first feature is directly or obliquely under the second feature or simply indicates that the first feature is lower than the second feature.

In the description of this specification, the description with reference to the terms such as “one embodiment”, “some embodiments”, “example”, “specific example” or “some examples” means that specific features, structures, materials or characteristics described in connection with the embodiment or example are included in at least one embodiment or example of the present disclosure. In this specification, schematic representation of the above terms is not necessarily directed to the same embodiment or example. Moreover, the specific features, structures, materials or characteristics described may be combined in a suitable manner in any one or more embodiments or examples. In addition, those skilled in the art may combine different embodiments or examples described in this specification and characteristics of the different embodiments or examples without mutual contradiction.

Although the embodiments of the present disclosure are illustrated above, it should be understood that the above embodiments are merely illustrative and may not be construed as limiting the scope of the present disclosure. Changes, modifications, substitutions and variations may be made to the above embodiments by a person of ordinary skill in the art within the scope of the present disclosure.

What is claimed is:

1. A folding cart, comprising a front frame mechanism, a rear frame mechanism, a bottom frame mechanism, a first folding mechanism, and a second folding mechanism, wherein the front frame mechanism and the rear frame mechanism are vertically and oppositely arranged, a first horizontal tube and a second horizontal tube are respectively hinged to two ends of the first folding mechanism, the first horizontal tube is hinged to a first side of the front frame mechanism, and the second horizontal tube is hinged to a first side of the rear frame mechanism; a third horizontal tube and a fourth horizontal tube are respectively hinged to two ends of the second folding mechanism, the third horizontal tube is hinged to a second side of the front frame mechanism, and the fourth horizontal tube is hinged to a second side of the rear frame mechanism; and the bottom frame mechanism comprises a first bottom frame assembly and a second bottom frame assembly hinged to each other, the first bottom frame assembly is hinged to the front frame mechanism, and the second bottom frame assembly is hinged to the rear frame mechanism;

wherein the folding cart further comprises a U-shaped boom, wherein a first end of the U-shaped boom is hinged to the first folding mechanism, a second end of the U-shaped boom is hinged to the second folding mechanism, and the first bottom frame assembly is allowed to abut against the U-shaped boom.

2. The folding cart according to claim 1, wherein the front frame mechanism and the rear frame mechanism each comprise a portal frame and a first connecting horizontal tube, and the first connecting horizontal tube is connected to a lower end of the portal frame.

3. The folding cart according to claim 2, wherein the portal frame comprises a second connecting horizontal tube, and a first vertical tube and a second vertical tube parallel to each other;

a lower end of the first vertical tube and a lower end of the second vertical tube are both connected to the first connecting horizontal tube, and an upper end of the first vertical tube and an upper end of the second vertical tube are both connected to the second connecting horizontal tube through bent tubes;

the first horizontal tube is hinged to the first vertical tube of the front frame mechanism, the second horizontal tube is hinged to the first vertical tube of the rear frame mechanism, the third horizontal tube is hinged to the second vertical tube of the front frame mechanism, and the fourth horizontal tube is hinged to the second vertical tube of the rear frame mechanism; and the first vertical tube and the second vertical tube of the front frame mechanism are both hinged to the first bottom frame assembly, and the first vertical tube and the second vertical tube of the rear frame mechanism are both hinged to the second bottom frame assembly.

4. The folding cart according to claim 1, wherein the first folding mechanism and the second folding mechanism each comprise a first fork lever assembly, a second fork lever assembly, and a third fork lever assembly hinged in sequence.

5. The folding cart according to claim 4, wherein the first fork lever assembly comprises a first crossover tube and a second crossover tube hinged to each other, the second fork lever assembly comprises a third crossover tube and a fourth crossover tube hinged to each other, and the third fork lever assembly comprises a fifth crossover tube and a sixth crossover tube hinged to each other;

the first crossover tube, the fourth crossover tube, and the fifth crossover tube are hinged in sequence, and the second crossover tube, the third crossover tube, and the sixth crossover tube are hinged in sequence;

the first crossover tube and the sixth crossover tube of the first folding mechanism are respectively hinged to the first horizontal tube and the second horizontal tube in one-to-one correspondence, and the first crossover tube and the sixth crossover tube of the second folding mechanism are respectively hinged to the third horizontal tube and the fourth horizontal tube in one-to-one correspondence; and the second crossover tube and the fifth crossover tube of the first folding mechanism are respectively hinged to the first side of the front frame mechanism and the first side of the rear frame mechanism in one-to-one correspondence, and the second crossover tube and the fifth crossover tube of the second folding mechanism are respectively hinged to the second side of the front frame mechanism and the second side of the rear frame mechanism in one-to-one correspondence.

6. The folding cart according to claim 1, wherein the first bottom frame assembly and the second bottom frame assembly each comprise a first vertical connection tube, a second vertical connection tube, and a bottom frame;

the bottom frame is connected between the first vertical connection tube and the second vertical connection tube, and the first vertical connection tube is parallel to the second vertical connection tube;

first ends of the first vertical connection tubes of the first bottom frame assembly and the second bottom frame assembly are hinged to each other, and second ends of the first vertical connection tubes of the first bottom frame assembly and the second bottom frame assembly are respectively hinged to the front frame mechanism and the rear frame mechanism in one-to-one correspondence; and first ends of the second vertical connection tubes of the first bottom frame assembly and the second bottom frame assembly are hinged to each other, and second ends of the second vertical connection tubes of the first bottom frame assembly and the second bottom frame assembly are respectively hinged to the front frame mechanism and the rear frame mechanism in one-to-one correspondence.

7. The folding cart according to claim 6, wherein the bottom frame comprises a first horizontal connection tube, a second horizontal connection tube, and a plurality of third vertical connection tubes;

a first end of the first horizontal connection tube and a first end of the second horizontal connection tube are both connected to the first vertical connection tube, a second end of the first horizontal connection tube and a second end of the second horizontal connection tube are both connected to the second vertical connection tube, the first horizontal connection tube is parallel to the second horizontal connection tube, and the plurality of third vertical connection tubes are arranged between the first horizontal connection tube and the second horizontal connection tube at intervals.

8. The folding cart according to claim 1, further comprising a handle mechanism, wherein the handle mechanism comprises a telescopic rod and a pull ring, a first end of the telescopic rod is hinged to the front frame mechanism, and a second end of the telescopic rod is connected to the pull ring.

9. The folding cart according to claim 1, wherein a bottom of the front frame mechanism and a bottom of the rear frame mechanism are each provided with a pair of rollers.

* * * * *